Dec. 26, 1967 H. HERLACH 3,359,858
AMMUNITION CONTAINER WITH CONVEYOR MEANS FOR THE
INTERMITTENT FEEDING OF SETS OF CARTRIDGES
Filed July 1, 1966 4 Sheets-Sheet 1

Inventor
Heinrich Herlach
By
Wenderoth, Lind & Ponack
Attorneys

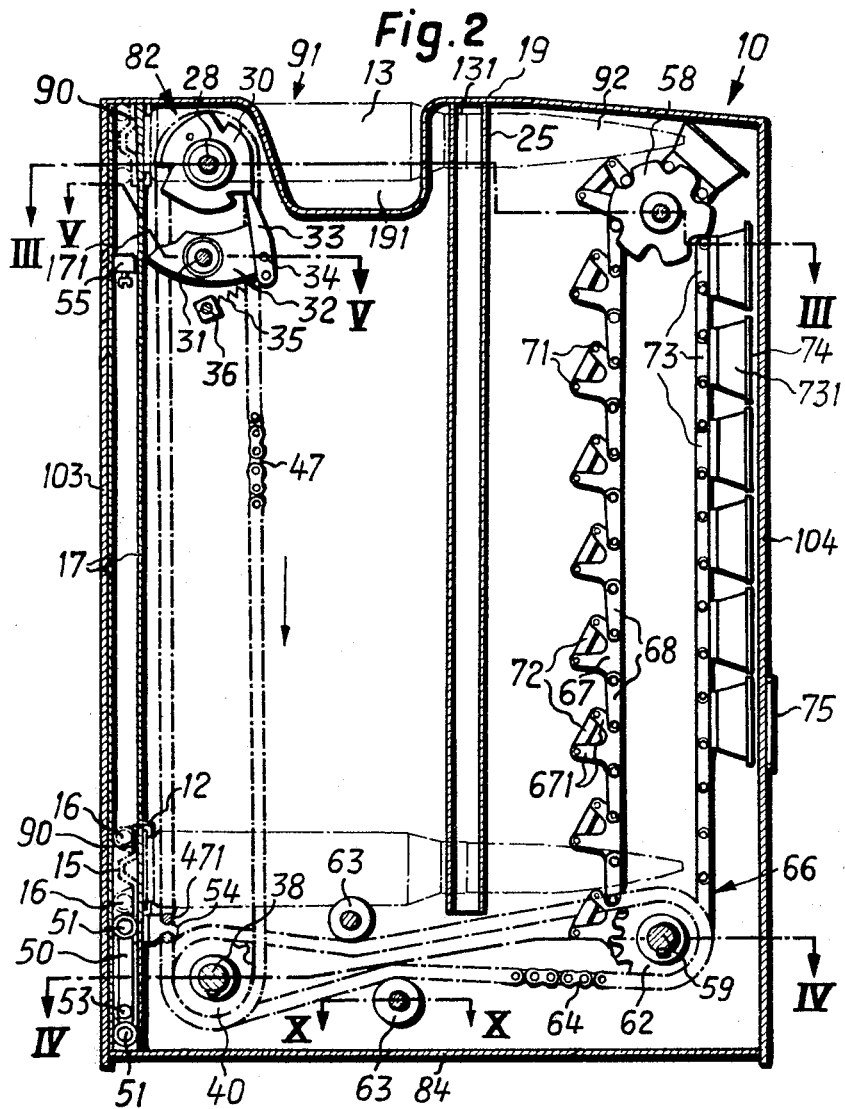

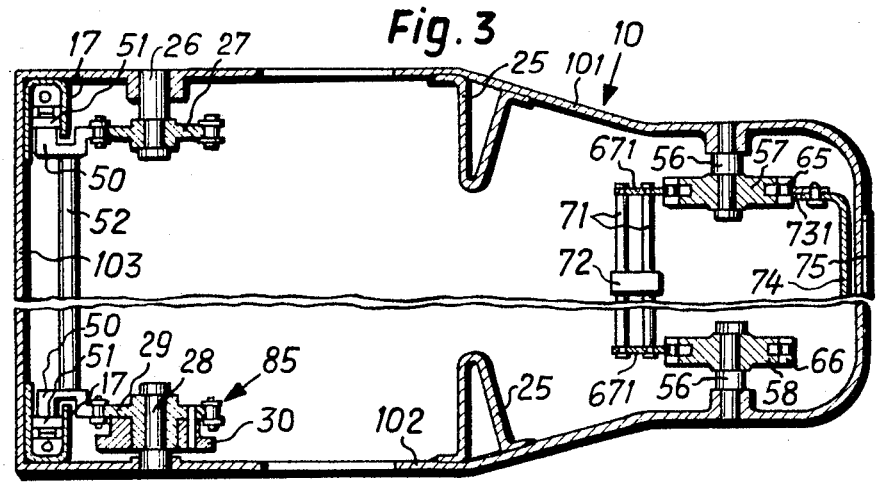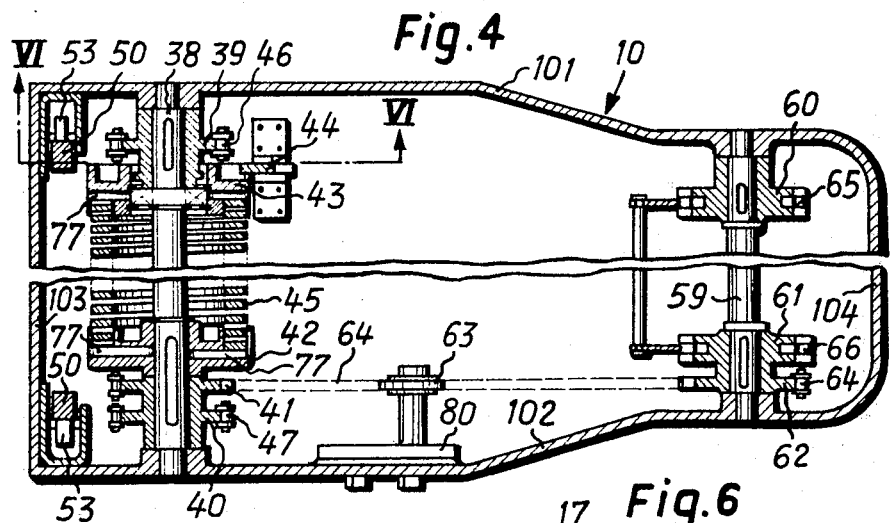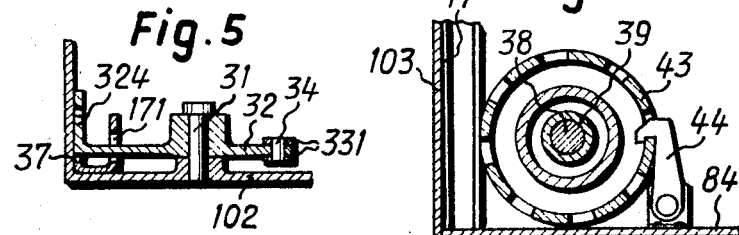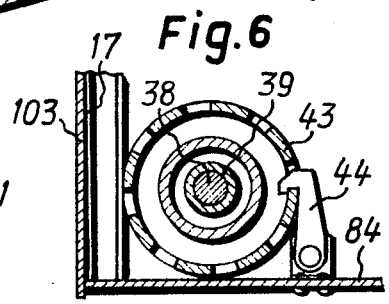

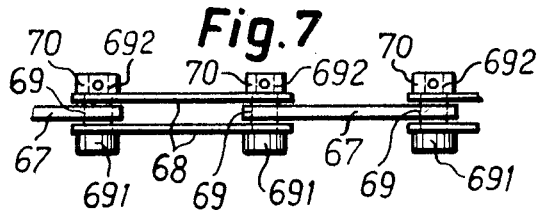
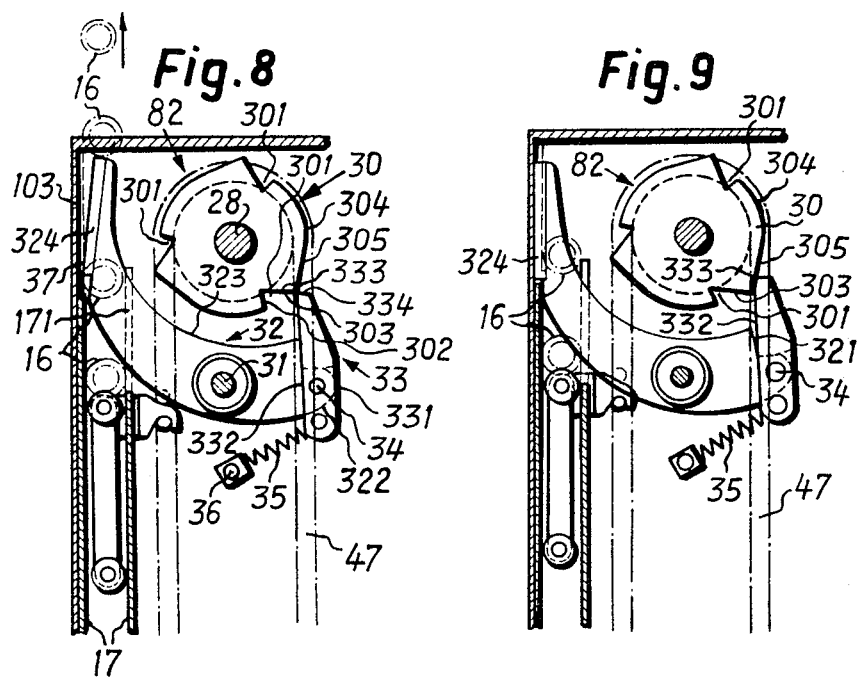
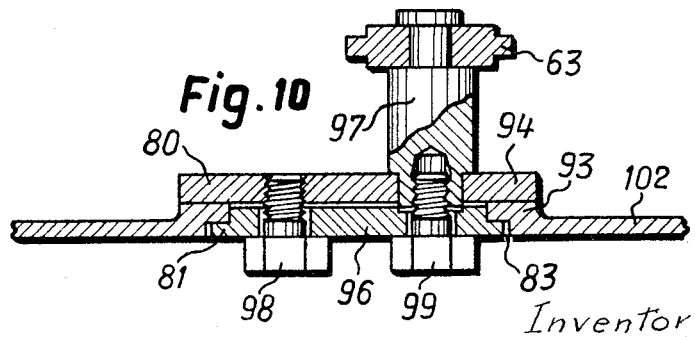

United States Patent Office 3,359,858
Patented Dec. 26, 1967

3,359,858
AMMUNITION CONTAINER WITH CONVEYOR MEANS FOR THE INTERMITTENT FEEDING OF SETS OF CARTRIDGES
Heinrich Herlach, Zurich, Switzerland, assignor to Oerlikon-Buhrle Holding Ltd., Zurich, Switzerland
Filed July 1, 1966, Ser. No. 562,151
Claims priority, application Switzerland, July 2, 1965, 9,320/65
3 Claims. (Cl. 89—34)

ABSTRACT OF THE DISCLOSURE

The ammunition container facilitates both the insertion and extraction of sets of cartridges. A locking device is provided for the conveying means activated by a spring. Such spring urges a contact surface on a ratchet wheel against a charger adjacent the feed orifice. Then upon release of the spring upon feeding a set of cartridges through the feed orifice a ratchet lever is held in locking position by a supplementary spring. On release of the ratchet lever caused by extraction through the feed orifice of the set of cartridges adjacent to the feed orifice, the ratchet lever swings into the release position through rotation of the ratchet wheel caused by spring activation and, after further rotation of the ratchet wheel, under the influence of the supplementary spring, comes into renewed engagement with the ratchet wheel.

---

The invention relates to an ammunition container in which the sets of cartridges, held in chargers arranged in layers, are, by means of a conveyor device with spring activation, movable along a straight-line path across the layer towards a feed orifice for the sets of cartridges, with a locking device for the conveyor device which is provided by a ratchet wheel in driving connection with the latter, and which has a ratchet lever, provided with a contact surface, which can be held in a locked position of the locking device by the charger adjoining the feed orifice, in a working position, in which it engages with the ratchet wheel and locks the conveyor device, and which is swingable against the force of a supplementary spring, into a release position, in which it is out of engagement with the ratchet wheel.

With a known container of this type, the conveyor device transports the sets of cartridges in a straight-line path to an extraction position, at which the extraction of the individual cartridges of a set of cartridges takes place at right angles to the path mentioned, by means of a special extraction device controlled by the firearm.

As the holding capacity of a magazine on a weapon is limited, additional sets of cartridges are stacked in special containers in the immediate vicinity of the weapon, in the case of which the sets of cartridges are inserted, also extracted, by hand by the gun crew. The use of the container mentioned for this purpose proves disadvantageous, as the extraction of a set of cartridges cannot take place by hand, nor all at once, but only step by step. This has a particularly disadvantageous effect in action by night, as in that case the movements of the gun crew should be arranged to be as simple as possible. With this known type of ammunition container, the construction of the locking device is particularly disadvantageous, as the ratchet arm of the locking device must be swung out of its working position for extraction of sets of cartridges, whereby the locking device and conveyor device are out of action and must be switched on again after each extraction.

An object of the invention consists in eliminating these disadvantages and facilitating both the insertion and extraction of sets of cartridges. The equipment in accordance with the invention is characterized in that, in the locked position of the locking device, the spring activation presses the contact surface on the ratchet wheel against the charger adjacent to the feed orifice, that furthermore, on release of the spring activation by feeding in sets of cartridges through the feed orifice, the ratchet lever is held in the working position by the supplementary spring, and that on release of the ratchet lever caused by extraction through the feed orifice of the set of cartridges adjacent to the feed orifice, the ratchet lever swings into the release position through rotation of the ratchet wheel caused by spring activation and, after further rotation of the ratchet wheel, under the influence of the supplementary spring, comes into renewed engagement with the ratchet wheel.

With the above and other objects in view which will become apparent from the detailed description below, a preferred embodiment of the invention is shown in the drawings in which:

FIGURE 2 is a cross-sectional view taken upon section line II—II of FIGURE 1.

FIGURE 3 is a cross-sectional view taken upon section line III—III of FIGURE 2.

FIGURE 4 is a cross-sectional view taken upon section line IV—IV of FIGURE 2.

FIGURE 5 is a cross-sectional view taken upon section line V—V of FIGURE 2.

FIGURE 6 is a cross-sectional view taken upon section line VI—VI of FIGURE 4 looking in the direction of the arrows.

FIGURE 7 is a partial plan view of a conveyor chain.

FIGURE 8 is a cross-sectional view with parts shown in elevation of the ratchet gear in one working position.

FIGURE 9 is a similar view showing the ratchet gear in another working position, and FIGURE 10 is a cross-sectional view taken upon section line X—X of FIGURE 2.

Figure 1:
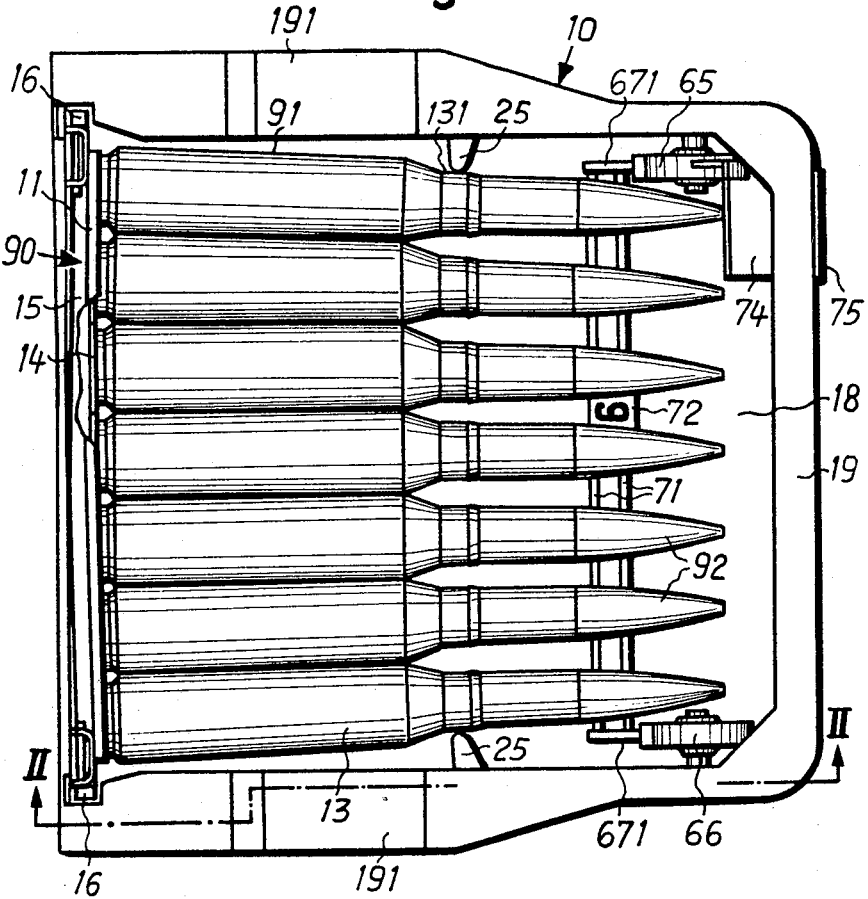
FIGURE 1 is a plain view of the container.

The container 10 is designed to stack sets of cartridges which are held in chargers 90 as transport units. A charger 90, shown in FIGURE 1 in plan and in cross section in FIGURE 2, consists of a sheet-metal strip 11, both longitudinal edges of which are bent to the front so that they form longitudinal grooves 12, the width of which corresponds to the height of the extraction rims 14 of the cartridges 13. The center portions of the chargers 11 are pressed outwards into a U-shaped corrugation 15, extending over the whole length of the charger. A couple of conveyor rollers 16 are supported in the two ends of the charger in each case. In the rear corners of the container 10 are fixed, reaching to the base, the guide rails 17, with U-profile, in which the rollers 16 are guided.

An opening 18 is hollowed out in the cover of the container (FIG. 1), which serves for inserting and removing the chargers. As shown in FIG. 2, in both sides of the cover sheet 19, recesses 191 are formed, the height of which is greater than the diameter of the cartridges 13.

As in FIGS. 1, 2 and 3, on the side walls 101 and 102 of the container 10, guides 25 are secured, which engage in the necks 131 of the two outside cartridges 13 held in the chargers 90 and, in conjunction with the rails 17, serve to guide the cartridge sets 91 in the container 10.

As shown in FIG. 3, a conveyor device 85, fitted with chains, is mounted on the two side walls 101 and 102. The sprocket wheels 27 and 29 are supported on the two shafts 26 and 28 mounted on the walls 101 and 102, whereby a ratchet wheel 30, forming part of a locking device 82, which is pivoted on the same shaft 28, is rigidly connected to the wheel 29.

As shown in FIG. 8, three saw-tooth shaped locking spaces 301, with equal angular spacing, are formed in the circumference of the ratchet wheel 30. One space 302 of the two areas of contact of a space 301 is arranged radially, while the other, 303, cuts a flat plane 305, going out tangentially from the circular periphery 304. On the shaft 31, below this ratchet wheel 30, connected to the container wall 102, is mounted a two-armed lever 32, one end of which has a stop face 321 and one end has a lug 322. In a hole in this lug 322, there is supported a bolt 34 rigidly connected to a fork-shaped part 331 of a pawl 33 gripping the lug 322. A spring 35, engaging with the lower end of the pawl 33, is supported on a pin 36 connected to the container wall 102. Under the pressure of this spring 35, the surface 332 of the pawl 33 is loaded in the direction of the surface 321 of the lever 32, so that the distance of its edge 333 from the swivel pin 28 is at least as great as the radius of the circular peripheral surface of the ratchet wheel 30. Furthermore, the lug 324 (shown in FIG. 5) of a lever 32 forming a contact element, set parallel to the swivel pin 28, engaging in a recess 37 in the rail 17, is pressed against the rear wall 103 of the container (FIG. 9).

As shown in FIG. 4, three sprocket wheels 39, 40 and 41, together with a washer 42, are keyed to a shaft 38 arranged above the container base 84, supported in the two side walls 101, 102. An additional washer 43 is supported rotatably on this shaft 38 and lockable by means of a pawl 44 pivoted on the container base 84 (FIG. 6). The ends, arranged concentrically to the shaft 38, of a spiral spring 45 forming the driving motor of the conveyor device are secured to these two washers 42 and 43 by means of bolts 77.

As shown in FIGS. 2 and 4, endless conveyor chains 46, 47, constructed as roller chains, are laid over the two pairs of sprocket wheels 27, 39 and 29, 40. The two carriers 50, each fitted with a pair of rollers 51, are guided in the rails 17, which are connected by a rod 52 lying parallel to the container rear wall 103 (FIG. 3). To each of these carriers 50 there is secured a stop 53 directed towards the base of a rail 17, and in addition a catch 54 which, interposing between two rollers 471 of the stringer lying next to, and parallel to, a rail 17 of a conveyor chain 46 and 47, grips one of these rollers 471. In the upper part of the rails 17, in the base of the same, stops 55 are inserted. These are so arranged that, on the carriers resting against the stops 55, the lever 32, actuated by the ratchet wheel 30, rests against the container wall with its lug 324.

Sprocket wheels 57, 58 are mounted on two pins 56 rigidly fixed to the container walls 101, 102. Three sprocket wheels 60, 61, 62 are keyed to a shaft 59, also supported in these container walls (FIG. 4). This shaft 59 is in driving connection with the shaft 38, through an endless chain 64 laid over the sprocket wheels 41 and 62.

Two eccentric devices 80, which both have a tensioning roller 63 (FIG. 2), serve for accurate adjustment of the conveyor device, so that the cartridges lie at right angles to the direction of feed. Each of these eccentric devices engages in a stringer of the chain 64 and is, as shown in FIG. 10, mounted in an aperture 83 in a circular collar 93 on the casing wall 102. A washer 96 is rotatably supported on the circular collar 93. The washer 96 with its flange 81 is pressed against the circular collar 93 by means of a second washer 94 and bolts 98, 99, so that a rigid connection takes place between the washers 94, 96 and the casing wall 102. Eccentric to the washer 96, a bolt 97, carrying the tension roller 63, is secured to the washers 93 and 94 by means of the bolt 99. To adjust the eccentric device 80, that is to be able to rotate the tension roller 63 with the washers 94 and 96 about the axis of the washer 96, the bolts 98 and 99 must first be loosened.

The two conveyor chains 65, 66 driven by the sprocket wheels 60, 61 and led over the wheels 57, 58 are made of links 67 and double links 68 which, as FIG. 7 shows, are flexibly connected by means of the pins 69. The bolt heads 691 and the washers 70, having the same diameter as these, secured to the shaft 692, engage in the spaces in the teeth of the sprocket wheels 57, 58 and 60, 61, constructed with double tooth rims. As FIG. 2 shows, a number of successive links 67 of a chain 65 or 66 have two lugs 671, directed towards the container rear wall 103, enclosing an acute angle. It can further be seen from FIG. 3 that the lugs 671 of the links 67 of the two chains 65 and 66, lying at the same height relative to the container base, each carry a rod 71 connected to these same chains. Each pair of these rods 71, connected to a link 67, forms a plane which is inclined to the container base. To these pairs of rods 71 are fastened labels 72, the sides of which facing towards the opening 18 in the container are marked with numbers from "1" to "9," corresponding to the numbers of sets of cartridges 91 which can be stacked.

As shown in FIGS. 2 and 3, a further number of successive links 73 of the chain 65 are provided with projecting parts 731 to which labels 74 are fastened. These are set at right angles to the plane formed by the two stringers of the chain 65. With the movement of the chain 65, the surfaces of the labels 74, provided with the numbers "1" to "9," run along the front container wall 104 past a sight opening 75 contained in the latter.

The operation is as follows. In the filled condition of the container 10 shown in FIGURE 2, the chargers 90, guided by the pairs of rollers 16 in the rails 17, lie touching on top of one another, whereby the whole stack is supported on the carriers 50, likewise movable in the rails 17, which rest with their lower rollers 51 on the container base. The shells 92 of the individual sets of cartridges 91 are secured by the rods 71 of the upper and lower lugs 671 of two successive links 67 of the chains 65 and 66, so that the cartridges are directed parallel to the container base. The shells 92 of the top set of cartridges 91 lie on the upper of each pair of rods 71, which carries the label 72 marked "9." Similarly, the succeeding sets of cartridges 91 going downwards are numbered by the labels 72, located immediately below the latter, carrying the numbers "8," "7," "6" . . . "1". The label marked "9" also, fastened to the chain 65, lies directly behind the sight opening 75 located in the front container wall 104. The labels of this chain 65, following successively upwards, carry the numbers "8," "7," "6" . . . .

The tensioned driving spring 45 of the conveyor device acts on the shaft 38 so that a downward pull is exerted on the stringers of the chains 46, 47 lying on the right in FIG. 2, and thereby a circumferential force acts on the sprocket wheels 27 and 29 which tends to turn these wheels in a clockwise direction, and therewith also the ratchet wheel 30 connected to the wheel 29. Rotation of the ratchet wheel 30 is, however, prevented because the surface 303 of the latter abuts against the surface 334 of the pawl 33, pivoted on the lever 32 (FIG. 2). Rotation of the lever 32 clockwise about its axis 31, and therewith release of the ratchet wheel 30, is however not possible, because the lower roller 16 of the pair of rollers lying on the right of the top charger 90 is clamped between the lever lug 324 and the front side wall 171 of the rail 17.

For removal of the top set of cartridges 91, an operator standing behind the rear wall 103 of the container, facing the latter, reaches with his hands in the recesses 191 of the side cover sheets 19, grasps the outermost cartridges 13 of this set and lifts up the set of cartridges. When, during this upward movement of the charger, the roller 16 runs off the lug 324 of the lever 32, then the latter is no longer retained and, under the pressure of the rotating ratchet wheel 30 which in this case overcomes the force of the spring 35 also acting on the lever 32, rotates clockwise until the surface 334 of the pawl 33 runs off the surface 303 of the ratchet wheel 30 (FIG. 8). As soon as the edge 333 of the pawl runs off the flat surface 305 of the ratchet wheel 30, and consequently only the spring 35 now acts in the counterclockwise direction, the lever 32 is brought back by the latter to its original position, in which the lever arm 323 occupies the contact position in which its lug 324 rests against the container wall 103.

On this rotation of the lever 32, a force is now transmitted through the flat surface 305 of the ratchet wheel 30 to the pawl 33 and turns the latter clockwise about its axis 34, whereby the surface 332 moves away from the surface 321 of the lever 32 (FIG. 9). When the ratchet wheel 30 has rotated so far that the pawl edge 333 rests on the contact point of the flat surface (305) with the circular surface 304, under the pressure of the spring 35 the pawl 33 again abuts against the surface 321 of the lever 32. On further rotation, the surface 303 of the next gap 301 in the ratchet wheel 30 now rests on the surface 334 of the pawl, whence the latter, and consequently also the sprocket wheel 29, come to a stop after completion of a full step shift. Further step shifts are possible until the stops 53 of the carriers 50 strike the stops 55 secured to the rails 17.

During the carrying out of such a step shift, the carriers 50, connected to the chains 46, 47, move and raise the stack of chargers resting on them, with corresponding release of the driving spring 45, by an amount corresponding to the height of such a charger 90, whereby the lower roller 16 of the pair of rollers on the right (as seen by the operator) of the charger, now conveyed to the top position again, arrives between the lever lug 324 and the wall 171 of the guide rail 17 and thereby prevents rotation of the lever 32 and the ratchet wheel 30 in the way already explained.

The movement of the drive shaft 38 is transmitted by the chain 64 to the shaft 59, so that the chains 65 and 66, moved by the latter, move in the same direction and at the same speed as the chains 46 and 47.

On inserting a set of cartridges 91 in the container 10 for stacking, if a reminder of cartridge sets is present, it is placed on the top set and pressed down by hand with a force of about 40 kg. As a result of this pressure, the stack of chargers 90 and the carriers 50 are moved downwards. The chains 46, 47, in driving connection with the carriers 50, are rotated counterclockwise (as viewed in FIG. 2) and the driving spring 45 is again wound up to an angle corresponding to a step shift by the washer 42 fixed to the shaft 38. With the counterclockwise movement of the chains 46, 47 of the sprocket wheels 27 and 29 and of the ratchet wheel 30, the circular surface of the latter moves along the edge 333 of the pawl 33 pivoted on the lever 32. Through the winding action of the flat surface 306 following the curved surface 304 of the ratchet wheel 30, the pawl 33 is rotated about its axis, then however it snaps into the next gap 301 in the ratchet wheel 30, whereby its surface 334 lies behind the surface 303 of the latter. Therewith, after cessation of the pressure exerted in inserting the set of cartridges 91, return clockwise rotation of the ratchet wheel 30, and hence also the undesired upward movement of the stack of sets of cartridges, is prevented.

These movements of the chains 46, 47 caused by the insertion of sets of cartridges 91, are transmitted to the front conveyor chains 65, 66 so that the rods 71, carrying the shells 92 of the sets of cartridges 91, are moved at the same speed as the chargers 90.

The compressive force which must be used in inserting the sets of cartridges 91 in the container corresponds to the difference between the total force transmitted by the spring 45 to the chains 46, 47 and 65, 66 and the weight of the sets of cartridges weighing down on the carriers 50 and the rods 71. The characteristic of the driving spring 45 for the conveyor device is so determined that the magnitude of this compressive force is practically always the same, irrespective of the degree of fullness of the container.

The number carried by the label 72, located immediately below the shells 92 of the top set of cartridges 91 at any time, moved by the chains 65, 66, indicates to the operator how many sets of cartridges the container holds at the moment. The same purpose is served by the labels 74 transported by the chain 65, the numbers of which can be read through the sight opening by a member of the gun crew situated further away from the container, for example by the gun commander.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. An ammunition container in which the sets of cartridges, held in chargers arranged in layers, are, by means of a conveyor device with spring activation, movable along a straight-line path across the layer towards a feed orifice for the sets of cartridges, with a locking device for the conveyor device which is provided by a ratchet wheel in driving connection with the latter, and has a ratchet lever, provided with a contact surface, which can be held in a locked position of the locking device by the charger adjoining the feed orifice, in a working position, in which it engages with the ratchet wheel and locks the conveyor device, and which is swingable against the force of a supplementary spring, into a release position, in which it is out of engagement with the ratchet wheel, characterized in that, in the locked position of the locking device, the spring activation presses the contact surface on the ratchet wheel against the charger adjacent to the feed orifice, that furthermore, on release of the spring activation by feeding in the sets of cartridges through the feed orifice, the ratchet lever is held in the working position by the supplementary spring, and that on release of the ratchet lever caused by extraction through the fed orifice of the set of cartridges adjacent to the feed orifice, the ratchet lever swings into the release position through rotation of the ratchet wheel caused by spring activation and, after further rotation of the ratchet wheel, under the influence of the supplementary spring, comes into renewed engagement with the ratchet wheel.

2. An ammunition container wherein sets of cartridges are held in chargers arranged in layers with conveyor means movable along a straight-line path across a layer towards a feed orifice for said sets of cartridges comprising spring means for activating said conveyor means, a locking device for said conveyor means comprising a ratchet wheel in driving connection with said conveyor means, a pivoted lever cooperating with said wheel having a contact surface held in locked position of said locking device by a charger adjoining the feed orifice and in working position, in which it engages said ratchet wheel and locks said conveyor means, a supplementary spring acting upon said lever against the force of which said lever is pivotable into a release position out of engagement with said ratchet wheel, said locking device in locked position under the action of said spring means urging a contact surface on said ratchet wheel against a charger adjacent said feed orifice, and on release of said spring means feeds in sets of cartridges through said feed orifice while said ratchet lever is held in working position by said supplementary spring, and on release of said ratchet lever caused by extraction through the feed orifice of the set of cartridges adjacent to the feed orifice, said ratchet lever swings into the release position by a rotation of said ratchet wheel by said spring means and after a further rotation of said ratchet wheel by said supplementary spring, engages again with said ratchet wheel.

3. An ammunition container wherein sets of cartridges are held in chargers arranged in layers with conveyor means movable along a straight-line path across a layer towards a feed orifice for said sets of cartridges comprising spring means for activating said conveyor means, a locking device for said conveyor means comprising a ratchet wheel in driving connection with said conveyor means, a pivoted lever cooperating with said wheel having a contact surface held in locked position of said locking device by a charger adjoining the feed orifice and in working position, in which it engages said ratchet wheel and locks said conveyor means, resilient means acting upon said lever against the force of which said lever is pivotable into a release position out of engagement with said ratchet wheel, said locking device in locked position under the action of said spring means urging a contact surface on said ratchet wheel against a charger adjacent said feed orifice, and on release of said spring means feeds in sets of cartridges through said feed orifice while said ratchet lever is held in working position by said resilient means, and on release of said ratchet lever caused by extraction through the feed orifice of the set of cartridges adjacent to the feed orifice, said ratchet lever swings into the release position by a rotation of said ratchet wheel by said spring means and after a further rotation of said ratchet wheel by said resilient means engages again with said ratchet wheel.

References Cited
UNITED STATES PATENTS 2,494,728  1/1950  Stacey et al. _____ 89—33

BENJAMIN A. BORCHELT, *Primary Examiner.*

S. C. BENTLEY, *Assistant Examiner.*